(No Model.)
G. S. STRONG.
PISTON.
No. 497,358. Patented May 16, 1893.
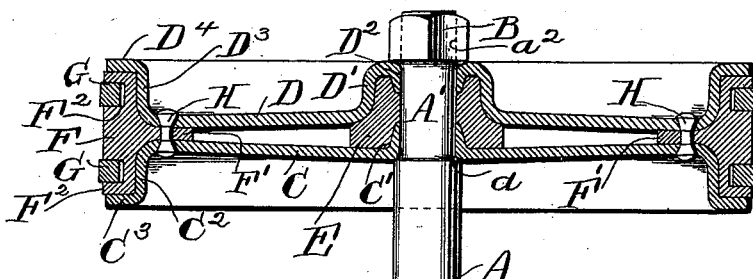
FIG. 1.
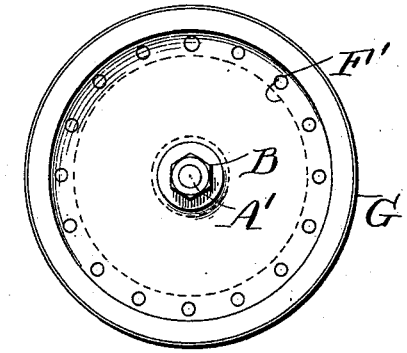
FIG. 2.
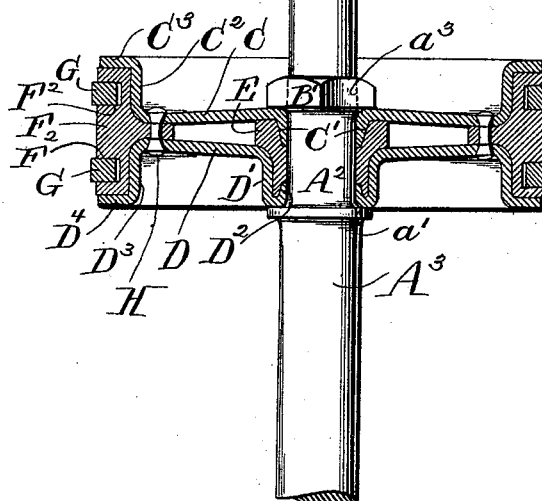
WITNESSES:
INVENTOR:
George S. Strong
by his atty.
Francis T. Chambers

UNITED STATES PATENT OFFICE.

GEORGE S. STRONG, OF NEW YORK, N. Y., ASSIGNOR TO JAMES N. GAMBLE, OF DAYTONA, FLORIDA.

PISTON.

SPECIFICATION forming part of Letters Patent No. 497,358, dated May 16, 1893.

Application filed September 19, 1892. Serial No. 446,330. (No model.)

*To all whom it may concern:*

Be it known that I, GEORGE S. STRONG, of the city, county, and State of New York, have invented a certain new and useful Piston, of which the following is a true and exact description, reference being had to the accompanying drawings, which from a part of this specification.

My invention relates to the construction of pistons for use in steam and other engines, and has for its object to provide a piston which shall be at the same time light, cheap and strong.

The nature of my improvement will be best understood as described in connection with the drawings in which it is illustrated, and in which—

Figure 1 is a central cross-sectional elevation of a piston rod having two pistons connected therewith, and Fig. 2 is a face view of a part of the rim of one piston.

A is the piston rod formed with a shoulder $a$ and an extension A' threaded at the end as shown at $a^2$. As shown the rod A is in effect an extension similar to A' of a rod $A^3$ which has a shoulder $a'$ at the point where the part of rod A marked $A^2$ joins it, said part $A^2$ being preferably tapered and threaded at $a^3$.

B and B' are nuts screwing on the threaded portions $a^2$ $a^3$ respectively.

C and D are sheet metal plates preferably of iron or steel and forged to the dish shape substantially as indicated, that is to say; the rims of the plates are flared or bent outward as at $C^2$ $D^2$ and the extreme edges again carried outward so as to lie substantially parallel to each other when the plates are brought together as shown. The centers of the pistons are perforated for the passage of the piston rod and are preferably bent as shown so as to grip a hub of bronze or other metal. Thus the inner edge of plate C is bent inward at C' so as to lie against the rod and the corresponding edge of plate D is bent first outward as at D', then inward as at $D^2$ forming a hook in which lies the hub E which is gripped between the inner edges of plates C and D.

Between the outer edges $C^3$ and $D^4$ I secure a bearing ring F preferably formed with an inwardly extending flange F' which lies between the body of plates C and D and through which and the plates C and D pass rivets or bolts H which secure the ring and plates together. The outer face of ring F is provided with annular recesses $F^2$ in which packing rings G are placed. The inner edges of the piston plates C and D are held against the hub block E by being gripped between the shoulder $a$ or $a'$ and the nut B or B'. It will be seen that by constructing the piston as described I am enabled to make it both strong and light, and to secure it together and to the piston rod by simple readily applied means.

The drawings, Fig. 1, shows a piston rod and pistons adapted for use in a compound engine; illustrating how easily my pistons can be adapted for such use.

Having now described my invention, what I claim as new, and desire to secure by Letters Patent, is—

1. A piston consisting of dished wrought metal plates C and D having flanges at their centers in combination with a bearing ring F situated between the rims of said plates, a hub E situated between said plates at their center and adapted to be held by the flanges thereof and means for drawing the plates together so as to tightly grip the ring F and hub E.

2. A piston rod A having a shoulder $a$ and extension A' of smaller diameter in combination with dished plates C D having flanges as C' D' at their centers, a bearing ring F situated between the rims of said plates a hub E situated between said plates at their center and adapted to be held by the flanges thereof and a nut B screwing on the end of the extension A' so as to clamp the piston between it and the shoulder $a$.

3. A piston consisting of dished wrought metal plates C and D in combination with a bearing ring F situated between the rims of said plates, a hub E situated between said plates at their center and means intermediate the center and the rim for holding the plates together so as to tightly grip the ring F and hub E.

GEO. S. STRONG.

Witnesses:
 LEWIS R. DICK,
 FRANCIS T. CHAMBERS.